(No Model.)
W. RADLEY & T. W. BEAL.
HAND CART.
No. 480,670. Patented Aug. 9, 1892.
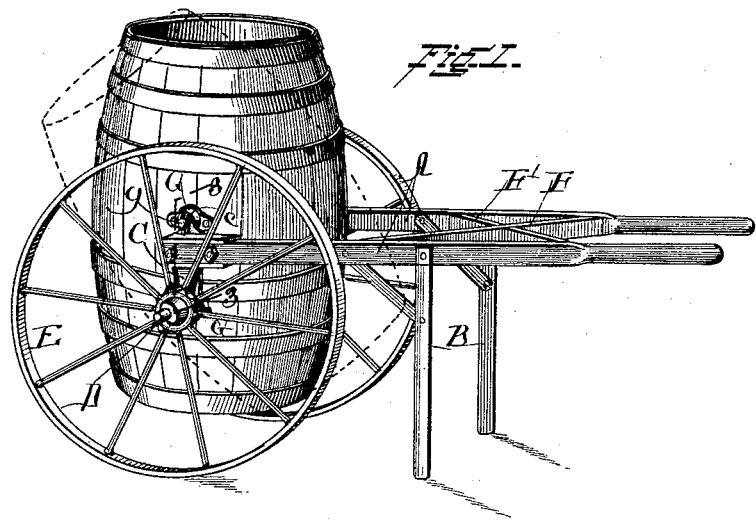
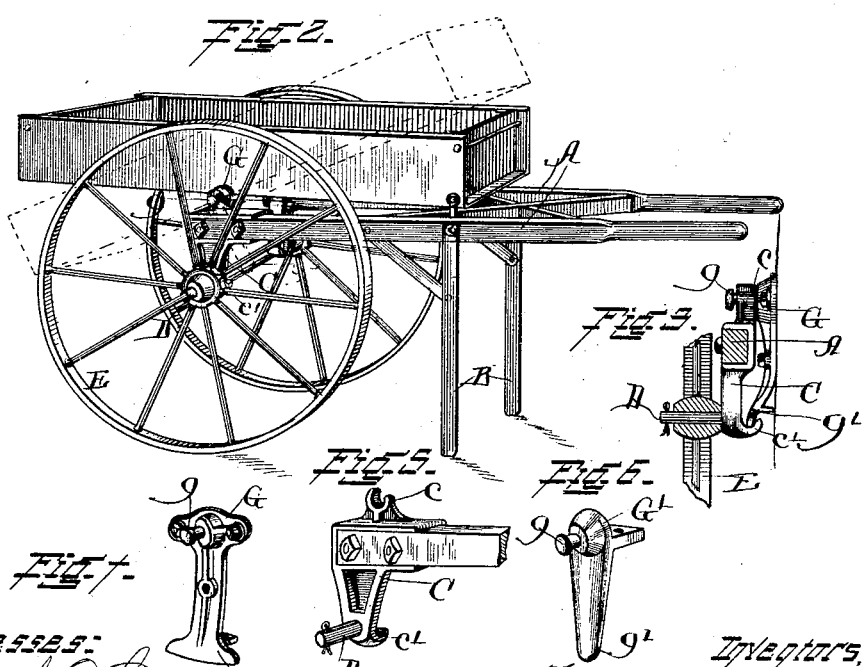
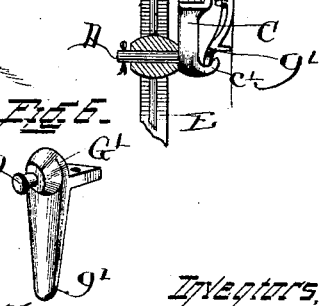
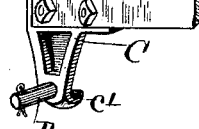
Witnesses:
Charles Hervey
Gerald Mahony
Inventors,
Thomas W. Beal
William Radley

UNITED STATES PATENT OFFICE.

WILLIAM RADLEY AND THOMAS W. BEAL, OF SANDWICH, ILLINOIS, ASSIGNORS TO THE SANDWICH ENTERPRISE COMPANY, OF SAME PLACE.

HAND-CART.

SPECIFICATION forming part of Letters Patent No. 480,670, dated August 9, 1892.

Application filed November 30, 1891. Serial No. 413,506. (No model.)

*To all whom it may concern:*

Be it known that we, WILLIAM RADLEY and THOMAS W. BEAL, citizens of the United States of America, residing at Sandwich, in the county of De Kalb and State of Illinois, have jointly invented certain new and useful Improvements in Carts, of which the following is a specification.

Our invention relates to certain improvements in a cart designed to carry either a barrel or a box and to be easily and readily attached to or detached from either.

It relates particularly to certain improvements in the framework of the cart and also in the means of engagement between the cart and the barrel or box. As to the former—namely, the improvements in the framework—their purpose is to make a strong and rigid frame as cheaply as possible, and as to the latter—that is, the means of engagement between the cart and the barrel or box—their purpose is to increase the security of such engagement and at the same time make the connection and disconnection as easy as possible.

The preferred form of our invention is shown in the drawings by means of six figures, of which—

Figures 1 and 2 are perspectives of the cart applied to barrel and box, respectively. Fig. 3 is a detail section taken vertically and transversely in line 3 3 of Fig. 1; and Figs. 4, 5, and 6 are detail perspectives.

The frame of the cart is made up of two handles A, provided with supporting-legs B and having at their ends depending castings C, bearing outwardly-projecting pins or axles D, upon which wheels E are mounted. To make a perfectly-rigid frame and at the same time to avoid interfering with the swinging of the barrel, we provide at some distance back from the wheels diagonal braces F F', secured together at substantially their middle points and each secured at its respective ends to the opposite handles. In carts of this class it is desirable, if not essential, to have the barrel pivoted upon the frame, in order that it may be tipped, if desired, to pour out its contents. For this purpose we form upon the castings C open sockets $c$, and secure to the barrel or box castings G G', provided with trunnions $g$, fitting into the open sockets. The open sockets are preferably arranged above the axles D upon the castings C, in order that the barrel or box may be deposited upon a suitable support and the cart removed therefrom by merely raising the handles A. In order that the twisting strain upon the forward portions of the handles A may be relieved, we provide upon the castings C inwardly-projecting hooks $c'$ and upon the castings G feet $g'$, adapted to rest and slide back and forth in the hooks $c'$. This arrangement gives a double engagement between the frame and the barrel or box, and as the two points of engagement are separated by some little distance it throws the whole weight of the load upon the wheels and does away with the necessity for a stout and clumsy frame to withstand the twisting of the handles A. It should be noticed that the castings G or G' rest upon the castings C at two points—namely, the open sockets $c$ and the hooks $c'$. This enables the hooks $c'$ to relieve the trunnions $g$ of a portion of any unusual strain, and it also makes it possible to remove the cart from the barrel or box in all cases by simply raising the handles and allowing it to roll from beneath the fastenings upon the barrel.

We claim as new and desire to secure by Letters Patent—

1. The combination, with a suitable frame and body, of a pivotal and also a sliding means of connection between the two, arranged one above the other and detachable by movement in the same direction, substantially as described.

2. The combination, with a suitable frame, of a body pivoted thereon and suitable means of engagement arranged at a distance vertically from the pivotal connection and adapted to permit of movement upon the pivot, but not otherwise, such engagement, as well as the engagement at the pivot, being in the proper direction to sustain the body, but not in a direction to prevent the body from being lifted from the frame, substantially as described.

3. The combination, with a suitable frame and body, of castings C upon the frame, having the open bearings $c$ and hooks $c'$, and castings G upon the body, having the trunnions $g$ and the feet $g'$, substantially as described.

WILLIAM RADLEY.
THOMAS W. BEAL.

Witnesses:
EUGENE HILL,
W. H. ROBERTSON.